United States Patent [19]

Smith

[11] Patent Number: 5,577,031
[45] Date of Patent: Nov. 19, 1996

[54] WIDEBAND CHANNELIZER INCORPORATING DIVERSITY SWITCH

[76] Inventor: Jeffrey W. Smith, 868 Gillen Ave., NW., Palm Bay, Fla. 32907

[21] Appl. No.: 408,665

[22] Filed: Mar. 22, 1995

[51] Int. Cl.$^6$ .................................................. H04Q 11/04
[52] U.S. Cl. ..................... 370/58.1; 370/108; 370/95.1; 375/347; 455/134
[58] Field of Search ................................ 370/95.1, 95.3, 370/58.1, 108; 375/347, 211, 214, 219, 295, 267, 316; 455/132, 133, 134, 33.1, 33.3, 274, 273, 127, 89; 379/59, 60, 63

[56] References Cited

U.S. PATENT DOCUMENTS

| | | | |
|---|---|---|---|
| 4,384,358 | 5/1983 | Shiki et al. | 375/347 |
| 4,704,734 | 11/1987 | Menich et al. | 455/134 |
| 4,733,402 | 3/1988 | Monsen | 375/347 |
| 5,127,025 | 6/1992 | Okanoue | 375/347 |
| 5,203,026 | 4/1993 | Ekelund | 455/134 |

Primary Examiner—Douglas W. Olms
Assistant Examiner—Ajit Patel

[57] ABSTRACT

A diversity technique for use in a multichannel receiver such as a cellular base station which includes at least a pair of wideband digital filter bank analyzers, or so-called channelizers, to provide digital output signals representing the signals received from a number of mobile subscriber units operating in or near the cell in which the base station is located. Samples of the digital output signals are presented to a time division multiplex (TDM) bus in a predetermined sequence, such as in a sequence which increases incrementally by channel number. A diversity decision is then made by processing each of the channelizer outputs for each channel in the sequence, to determine which one of the outputs contains the strongest receive signal. The channelizer path so determined is then connected to the rest of the base station, on a per channel basis, through a delay unit and multiplexer. As a result, the diversity-enhanced outputs remain in the same time division multiplex, pre-defined sequence so that further base station processing, such as demodulation, can occur in the same way as for a wideband base station system which does not take advantage of diversity techniques.

8 Claims, 3 Drawing Sheets

WIDEBAND CHANNELIZER INCORPORATING DIVERSITY SWITCH

FIELD OF THE INVENTION

This invention relates generally to cellular communication systems, and in particular to a system which uses multiple wideband base station receivers at each of several cell sites to determine an optimum active receiver on a per channel basis.

BACKGROUND OF THE INVENTION

The ever-increasing demand for wireless communication services, such as cellular mobile telephone (CMT), digital cellular network (DCN), and personal communication services (PCS), requires the operators of such systems to attempt to make maximum effective use of the available radio channels. To that end, the geographic territory covered by such systems is typically divided into a number of portions, called cells. The system operator splits up the allocated frequency channels among the cells, so that units operating in adjacent cells do not interfere with one another. Base stations are deployed throughout the assigned territory, with there typically being one base station located in each cell which services the mobile subscriber units traveling through that cell.

In such a scenario, only a fixed number of transmit and receive operating frequencies are thus made available to service the mobile units in each cell. One way to cope with the ever-increasing demand for cellular services is to shrink the size of each cell. However, as the density of cells increases, the number of times that a given mobile unit crosses a cell boundary also increases. This movement of a mobile unit across a cell boundary must be detected, so that the mobile can be reassigned a new pair of frequencies on which to operate in the new cell.

This process, known as hand-off, must occur quickly, so that no interruption of a call in progress can be perceived. Unfortunately, at certain cell densities, the time to process a hand-off may become a significant factor in the ability of such systems to consistently provide reliable telecommunication service.

There are at least two factors which determine the speed at which a hand-off must occur, including (1) the rate at which the mobile unit passes through the cells, and (2) the extent to which non-uniformities in the radiated electromagnetic field in the cell affect the ability to accurately detect the signal from the mobile unit. Both of these factors depend upon time required to accurately determine the relative location of the mobile unit. With respect to the speed of movement through the cells, in certain proposed PCS systems, the cells may be as small as five hundred (500) feet in radius. Thus, a mobile unit traveling only a few feet may require the handing off of the unit from one base station to a second and perhaps to even a third base station.

With respect to the second factor, because electromagnetic fields are usually non-uniform, a measurement of signal strength is typically made a number of times and then averaged. The time required to perform this measurement becomes longer as the susceptibility of the electromagnetic field to fading effects increases, such as may occur in an urban environment.

Diversity combining techniques can be used to compensate for fading by generating a number of signal transmission paths, or diversity branches, each of which carry the same information signal, but which have uncorrelated multipath fadings. The diversity branches are then combined in some way to resolve the actually transmitted signal. It would be desirable to reduce the complexity of the operations required in detecting the position of a mobile unit, by taking advantage of diversity combining techniques in as efficient a manner as possible, with a minimum number of base station antennas and associated receiver processing and control equipment.

This can, however, be especially difficult in the case where the basestation makes use of a wideband receiver which provides signals from many different remote units at the same time, because the multipath fadings must be compensated for each radio channel.

SUMMARY OF THE INVENTION

Briefly, the invention is a diversity technique for use in a cellular communication system in which each base station includes at least a pair of wideband digital filter bank analyzers, or so-called channelizers, that provide digital output signals representing the signals received from a number of mobile subscriber units operating in or near the cell in which the base station is located. Samples of the digital output signals are presented to a time division multiplex (TDM) bus in a predefined sequence, such as in a sequence which increases incrementally by channel number.

A diversity decision is then made by processing each of the channelizer outputs for each channel in the sequence, to determine which one of the outputs contains the strongest receive signal. In particular, the samples of the digital output signals from the pair of channelizers, which are provided as in-phase (I) and quadrature (Q) samples, are each first fed to a magnitude function. A diversity decision logic circuit then compares the outputs of the two magnitude functions on a per channel basis, to determine a greatest channel magnitude. The channelizer path so determined is then connected to the rest of the base station, on a per channel basis, through a delay unit and multiplexer. As a result, the diversity-enhanced outputs remain in the same time division multiplex, pre-defined sequence so that further base station processing, such as demodulation, can occur in the same way as for a system which does not take advantage of diversity techniques.

In a preferred embodiment, diversity decision logic is implemented for each of the channelizers, and a local channel magnitude and a local decision logic signal are exchanged between the channelizers. A register in each diversity logic circuit is then used to control which of the channelizers is permitted to assert its output onto a time division multiplex bus in the proper sequence. This arrangement permits the design of each of the channelizers to be identical, while at the same time providing fail-safe operation in the event that one of the channelizers fails.

There are several advantages to the invention.

It provides an efficient way to implement diversity combining in a wideband channelized receiver, while retaining all of the advantages of a wideband receiver architecture.

The diversity decision is made, on a per channel basis, across the entire range of frequencies available to the basestation. Thus, individual channels always have the highest signal strength available.

BRIEF DESCRIPTION OF THE DRAWINGS

The above and further advantages of the invention may be better understood by referring to the following description in conjunction with the accompanying drawings in which.

DETAILED DESCRIPTION OF A PREFERRED EMBODIMENT

Figure 1:
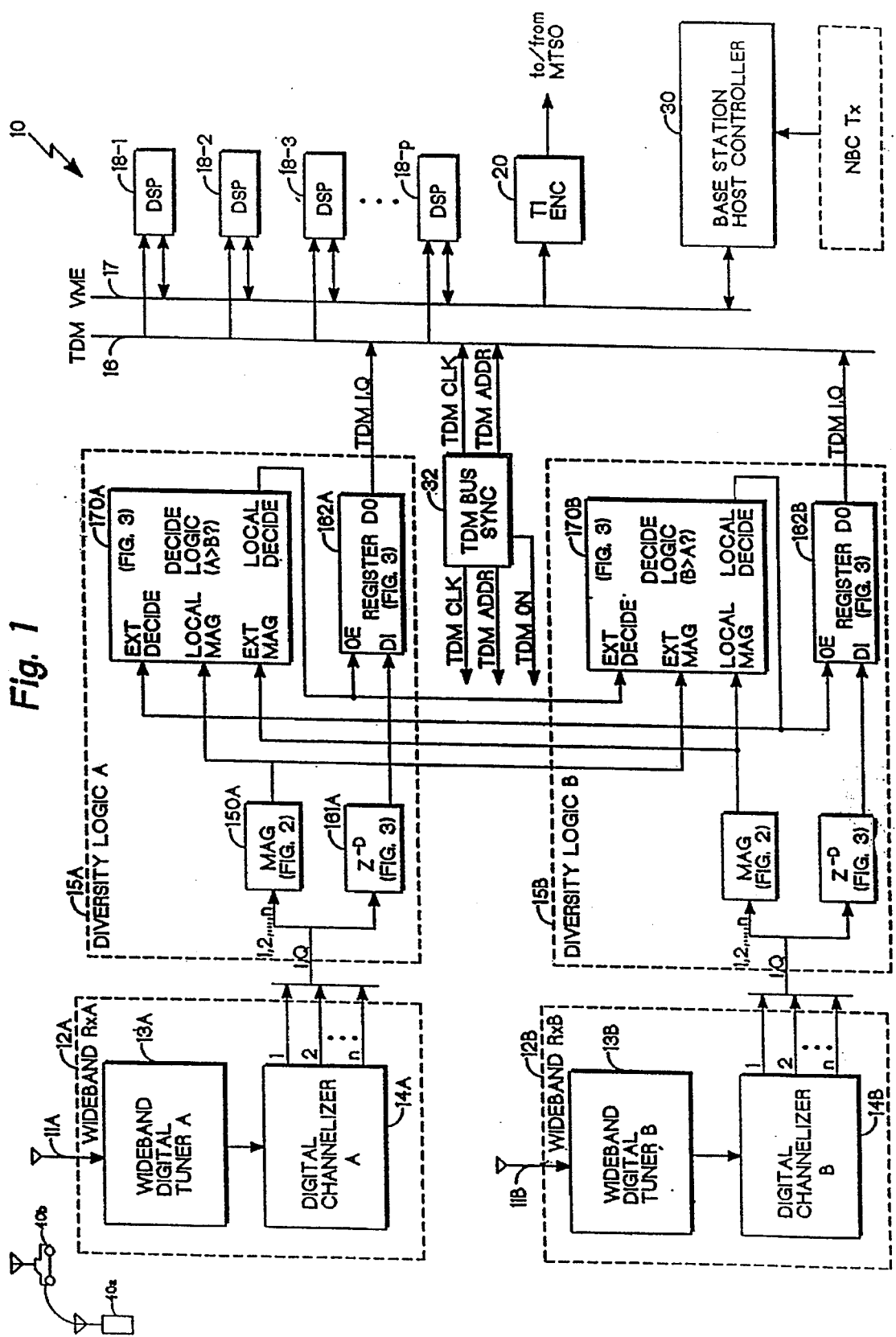
FIG. 1 is a block diagram of a wideband digital receiver making use of a diversity switching apparatus according to the invention.

Turning attention now to the drawings more particularly, FIG. 1 is a block diagram of a wideband receiver 10 which incorporates diversity decision logic according to the invention. Briefly, the function of the diversity decision logic is to determine which one of at least two receiver paths contains the strongest received signal, on a per-channel basis. The path so selected is then connected to the rest of the system for further processing, such as demodulation. In accordance with the invention, the diversity decision is made on a per channel basis, so that the signal received from each remote unit will always be processed with the highest available signal strength.

By way of brief introduction, the invention accomplishes this result by using wideband channelizers 14A, 14B, . . . 14N, (collectively, channelizers 14) to process signals from a like number to antennas 11A, 11B, . . . 11N, (collectively, the antennas 11). The wideband channelizers 14 each produce baseband digital channel signals in a time multiplexed format, such that digital samples of respective channels are provided in a predetermined sequential order. A magnitude circuit (such as shown by circuit 150A) operates on each sequential channel output from each channelizer (such as channelizer 14A). After being delayed by a delay circuit 161A, to account for the processing time of the corresponding magnitude circuit 150A, the channel with the largest magnitude is selected to be the one asserted on a time division multiplex (TDM) bus 16 by a diversity decision logic circuit 170A. The diversity logic 170A preferably contains a certain amount of hysteresis so that channel switching will occur only when one signal path is significantly stronger than the other.

In the preferred arrangement, a diversity logic circuit 170A, 170B is implemented as an identical but separate unit for each channelizer 14A, 14B. The magnitude output from each diversity logic block 170A, 170B is made available to the companion circuit, so that the decision logic for each channel not only considers a local magnitude, but also considers an external decision, e.g., the local decision made for each of the other channelizers, again on a per-channel basis.

Continuing to refer to FIG. 1, the invention will now be described in greater detail. In one preferred embodiment, the wideband diversity receiver 10 consists of a pair of receive antennas 11A, 11B; a pair of wideband digital receivers 12A, 12B which consist of a pair of tuners 13A, 13B and a pair of digital channelizers 14A, 14B; a pair of diversity logic circuits 15A, 15B; a time division multiplex (TDM) bus 16; a control bus 17; a plurality of digital signal processors (DSPs) which are programmed to operate as demodulators 18-1, 18-2, . . . , 18-$p$ (collectively, demodulators 18); a transport signal (T-1) encoder 20; a basestation control processor (controller) 30; and a TDM bus synchronization circuit 32.

In operation, the wideband diversity receiver 10 receives radio frequency (RF) signals from a number of mobile subscriber terminals (mobiles) 40A, . . . , 40B. The RF signals are modulated with voice and/or data (so-called channel) signals which are to be coupled to the public switched telephone network (PSTN) by the basestation 10. The particular modulation (air interface) in use may be any one of a number of different wireless standards, such as the well known Advanced Mobile Phone Service (AMPS), time division multiple access (TDMA) such as IS-54B, code division multiple access (CDMA) such as IS-95, frequency hopping standards, such as the European Groupe Speciale Mobile (GSM), personal communication services (PCS) standards, or the like.

In an exemplary wideband receiver 12A, the RF modulated signals are first received from the receive antenna 11A and then forwarded to the wideband digital tuner 12A. The digital tuner 12A downconverts the RF signal received at the antenna 11A to a intermediate frequency (IF) and then performs an analog to digital (A/D) conversion to produce a digital composite signal.

The digital tuner 13A is wideband in the sense that it covers a substantial portion of the bandwidth available to the wireless service provider. For example, if the air interface implemented is IS-54B, the wideband digital tuner may downconvert as much as a 12.5 MegaHertz (MHz) bandwidth in the 800–900 MHz range which contains as many as 416 channel signals, each having an approximately 30 kilohertz (kHz) bandwidth.

The digital channelizer 14A is the functional equivalent of a bank of digital filters which separates the downconverted composite digital signal to a plurality, N, of digital channel signals 1, 2, . . . , N. In the case of IS-54B, since the channel bandwidth is 30 kHz, the digital channelizer 14A is the equivalent of a bank of digital filters each having a 30 kHz bandwidth.

The digital channelizer 14A may implement the filter bank in any one of several different ways, and no particular digital filter structure is critical to the operation of the invention. However, in one preferred embodiment, the digital channelizer 14A consists of a convolutional digital filter and a Fast Fourier Transform (FFT) processor. The convolutional digital filter makes use of multirate digital filter techniques, such as an overlap-and-add or polyphase, to efficiently implement the digital filter bank by grouping samples of the downconverted signal together, multiplying the sample groups by a convolutional function, and then forwarding the samples to the FFT for conversion into the N individual channel signals.

Our co-pending United States patent application entitled "Transceiver Apparatus Employing Wideband FFT Channelizer with Output Sample Timing Adjustment and Inverse FFT Combiner for a Multichannel Communication Network", Ser. No. 08/224,754, filed Apr. 8, 1994 now U.S. Pat. No. 5,537,435 and which is assigned to AirNet Communications Corporation, the assignee of this application and for which a corresponding PCT application Ser. No. US95/02997 was published on Oct. 19, 1995, describes several particular embodiments of the digital tuner 13A and digital channellizer 14A in detail.

In any event, the N individual digital channel signals 1, 2, . . . , N, each representing information in one of the radio frequency channels originated by one of the mobiles 40, are then eventually provided over the time division multiplex (TDM) bus 16 to the plurality of digital signal processors (DSPs) 18-1, 18-2, . . . , 18-$p$ (collectively, demodulator- DSPs 18). The TDM bus 16 operates as a time division multiplexed cross-bar switch. That is, any one of the N digital channel signals 15 may be connected to any one of the demodulator DSPs 18 via the TDM bus 16.

However, before passing the N digital channel signals from the channelizer 14A to the TDM bus 16, diversity decision logic 15A determines which ones of the sequential outputs of digital channelizer 14A are to be to asserted on a per channel basis. The wideband transceiver 12B, being identical in all aspects to wideband transceiver 12A and including its own diversity logic circuit 15B, in turn determines when to assert the outputs of digital channelizer 14B on the TDM bus 16.

An exemplary diversity logic circuit 15A will now be described in greater detail (with the understanding that diversity logic circuit 15B is identical to diversity logic 15A). The diversity logic circuit 15A consists of a magnitude circuit 151A, a decision logic circuit 170A, a delay circuit 161A, and an output register 162A. The magnitude circuit 150A is shown in greater detail in FIG. 2; the decision logic 170A, delay 161A, and output register 162A are shown in greater detail in FIG. 3.

Figure 2:
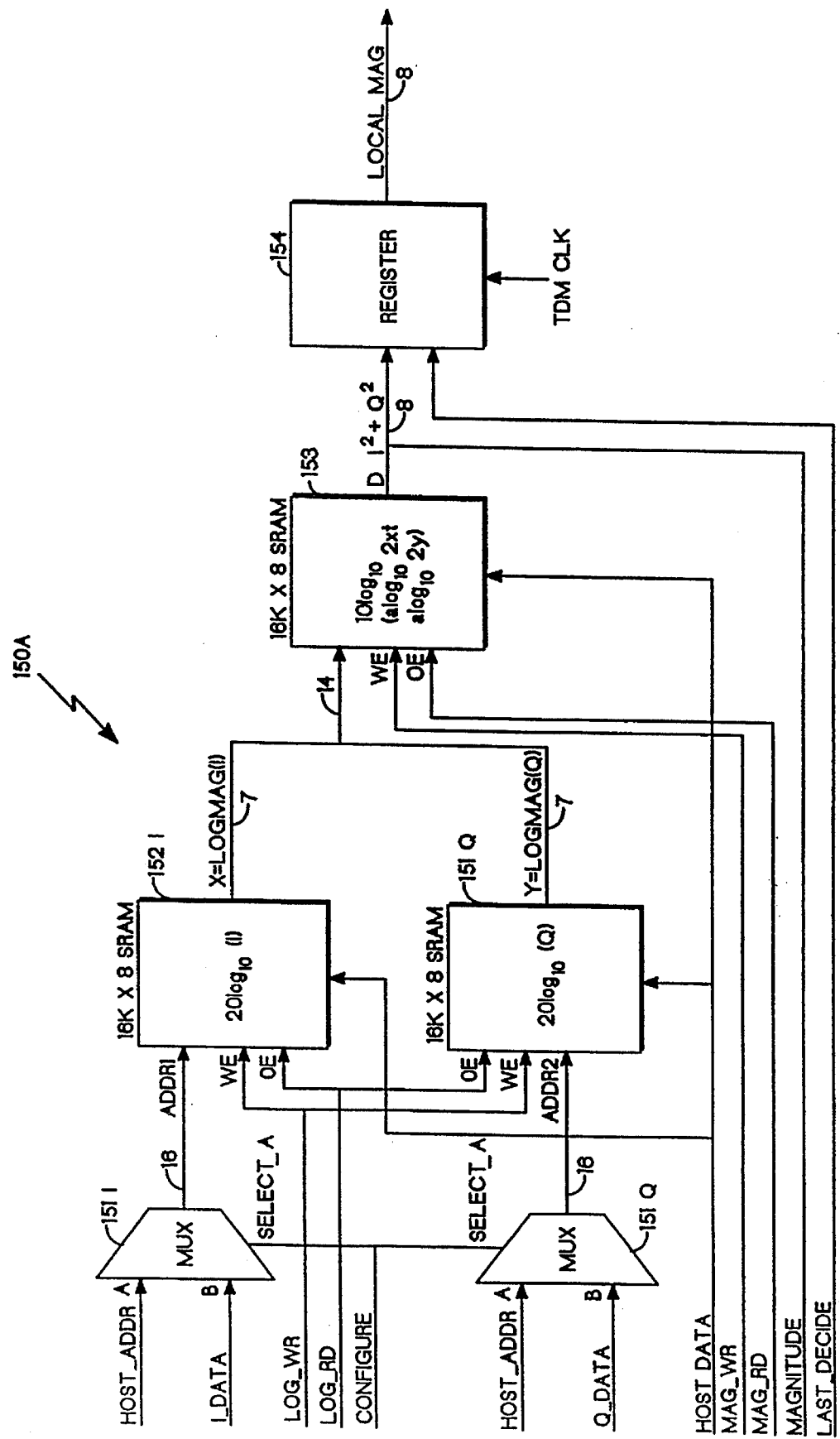
FIG. 2 is a detailed block diagram of a magnitude circuit used in the diversity switching apparatus.

Turning attention to FIG. 2, the magnitude circuit 150A consists of a pair of input multiplexers 151I, 151Q, a pair of logarithm look-up tables 152I, 152Q, a magnitude look-up table 153, and an output register 154.

The in-phase and quadrature (I and Q) outputs from the digital channelizer 14A provide the I-DATA and Q-DATA inputs to multiplexers 151I and 151Q, respectively. The signals I-DATA and Q-DATA represent the baseband quadrature data samples provided by the channelizer, in sequence, such as by increasing channel number.

The multiplexers 151I and 151Q each also receive a host address input HOST-ADDR to the look-up tables 152I and 152Q, so that the look-up tables may be initialized. The I-DATA, Q-DATA, or HOST-ADDR inputs are selected depending upon which of two modes are enabled via the configure inputs to the multiplexers 151I and 151Q.

Before beginning a discussion of the operation of the components of the magnitude circuit, a discussion of the various input signals will be helpful. First, the CONFIGURE signal enables the static rams (SRAMS), which are used to implement tables 152I, 152Q, and 153 to be loaded with look-up table data by the host controller 30. The HOST-DATA signal is a data bus provided by the host controller 30. HOST-ADDR, also provided from the host, holds the write address for the loading process. The signals LOG-WR and LOG-RD, are the host address decode for write and read operations respectively. Similarly, MAG-WR and MAG-RD are host address decode write and read signals for writing the magnitude table 153. These decode signals are held inactive when not in the CONFIGURE mode. The LOG-WR, LOG-RD, MAG-WR and MAG-RD signals may all typically be generated by decoding an address on the host address bus.

The tables 152I and 152Q are logarithmic look-up tables which each provide an output equal to $$20 \log_{10},$$

or logarithmic magnitude, of the respective input.

In an operational mode, the LOG-WR signal is deasserted, so the look-up tables 152I and 152Q will provide the logarithmic magnitude output data. In a configuration mode, the LOG-WR signal is asserted, so that data appearing at the input of the magnitude circuit at the HOST-ADDR input may be used to program the look-up tables 152I and 152Q.

The magnitude look-up table 153 is similarly programmed, by asserting the MAG-WR signal, when the CONFIGURE signal is asserted, to select the HOST-ADDR input. In this mode, the logarithm look-up tables 152 are first loaded with a series of addresses, so that indirect addressing may be used to load the magnitude table 153. During the process of programming the look-up tables, 152I, 152Q and 153, data inputs are provided via a HOST-DATA bus.

In the other, or operational mode, the CONFIGURE signal is enabled so that the I-DATA and Q-DATA signals from the respective channelizer 14 are fed to the logarithmic look-up tables 152I and 152Q. In a preferred embodiment, the I-DATA and Q-DATA signals are provided as 16-bit signals, and the log magnitude circuits 152I and 152Q each, in turn, provide a 7-bit value, X and Y, indicative of the magnitude of the respective I and Q channel.

The log magnitude signals X and Y are then combined to provide a 14-bit input to the magnitude table 153, which provides a signal representative of:

$$10 \log_{10}(a\log_{10}2X + a\log_{10}2Y)$$

The output of the magnitude look-up 153 is thus a 8-bit value indicating the magnitude of the present channel.

Since the channel outputs occur in sequential order respectively with channel numbers 1, 2, ..., N, the output of the magnitude circuit 153 thus also represents a time-sequential series of magnitude values for the N channels, in the same order as the I-DATA and Q-DATA signals input to the magnitude circuit I5OA.

The output register 154 is clocked in synchronism with a clock signal TDM-CLK generated by the TDM bus synchronization circuit 32. The output is thus a digital LOCAL-MAG signal which changes state in synchronism with the operations on the TDM bus 16.

Figure 3:
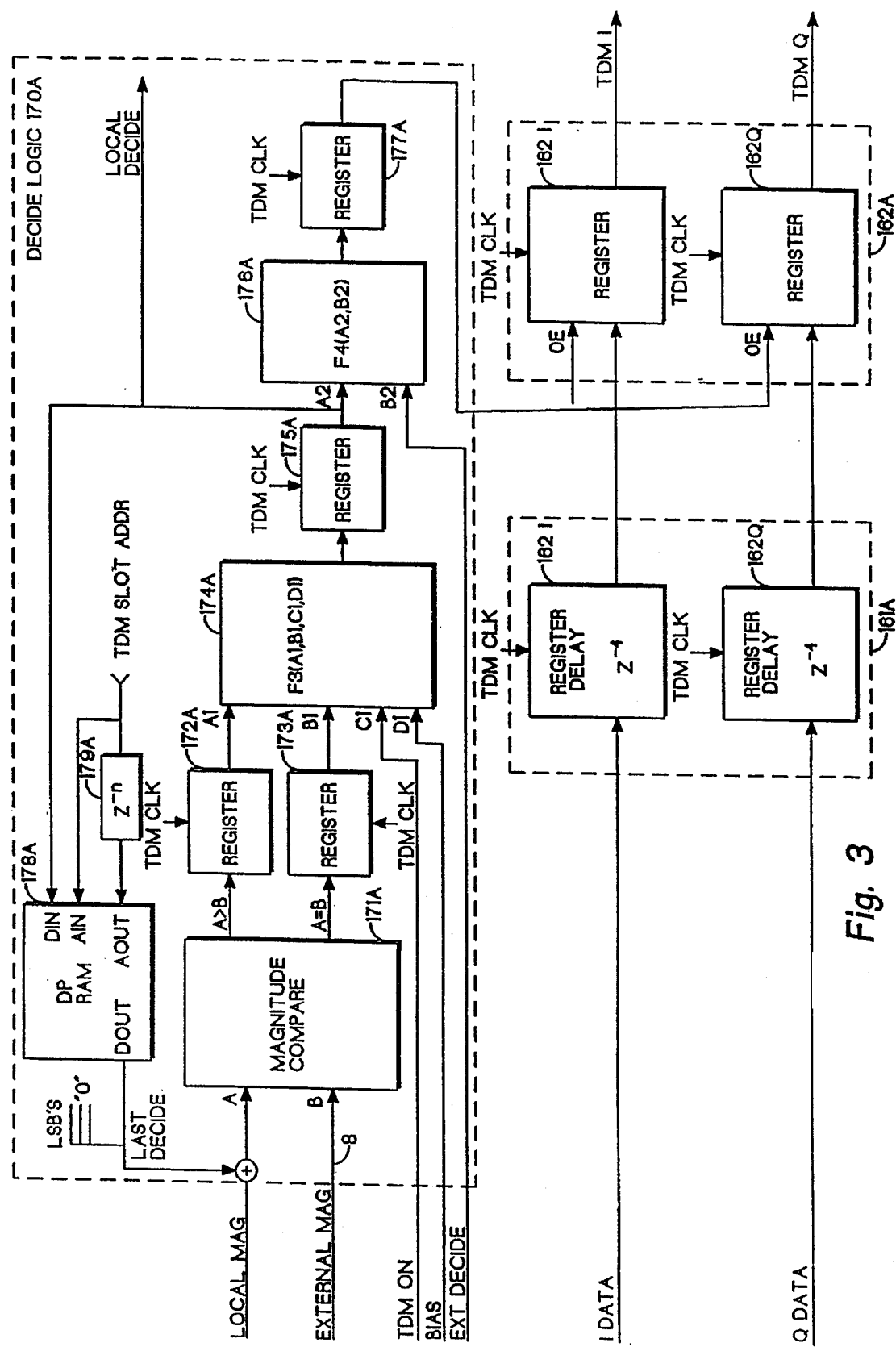
FIG. 3 is a detailed block diagram of a diversity logic circuit.

Turning attention to FIG. 3, there is shown a more detailed view of the decide logic 170A, delay unit 161A and register unit 162A which are used to implement the remainder of the diversity logic 15. The delay circuit 161A receives the I-DATA and Q-DATA signals from the channelizer 14. The delay unit 161A, being clocked by the TDM-CLK in synchronism with the TDM bus 16, implements a delay sufficient to compensate for the time delay through the decide logic block 160A. The outputs of the delay block 161A are provided to the register unit 162A. The register unit 162A uses a register 162I and 162Q associated with each of the I and Q channels, respectively. The registers 162I, 162Q are also clocked by the TDM-CLK signal so that their outputs are synchronous with the operations of the TDM bus 16.

The output enables (OE) inputs of the registers 162I and 162Q are provided by the output of the decide logic 170A. Thus, the outputs of registers 162I and 162Q, comprising the output register 162A, are only asserted when the decide logic 170A determines that the output of the local channelizer is the one which contains the greater magnitude signal, and thus is the one that should be asserted on the TDM bus 16.

A detailed circuit diagram of the decide logic 170A is also shown in FIG. 3, and consists of a magnitude compare circuit 171A, a pair of registers 172A and 173A, a first assertion logic circuit 174A, a register 175A, a second assertion logic circuit 176A and an output register 177A, a hysteresis memory 178A, and a delay unit 179A.

The magnitude compare circuit 171 determines which of the magnitude outputs, either LOCAL-MAG or EXT-MAG, is greater. The LOCAL-MAG signal is fed to an "A" input, and is the same LOCAL-MAG signal generated by the magnitude circuit 150A associated with this channelizer 14A. The external magnitude signal, EXT-MAG, is the magnitude signal from the other channelizer 14B having been calculated by the magnitude block 150B associated with that other channelizer 14B. The magnitude compare circuit 171A provides two outputs, one indicating whether LOCAL-MAG is greater than EXT-MAG (e.g. A>B) and the other indicating whether LOCAL-MAG equals EXT-MAG.

These signals from the magnitude compare 171A are made synchronous with the TDM bus 16 by feeding them to registers 172A and 173A, respectively, which are clocked by the TDM-CLK signal.

The first assertion logic circuit 174A then receives the outputs of the registers 172A and 173A at inputs A1 and B1, respectively. The first assertion logic circuit 174A also receives logic signals TDM-ON and BIAS, at inputs C1 and D1, which are received from a central controller such as the host controller 30.

The first assertion logic circuit 174A performs the logical operation:

F3=C1 and (A1 or (not B1 and D1), where A1 indicates whether the LOCAL-MAG is greater than the EXT-MAG, B1 indicates whether the LOCAL-MAG equals the EXT-MAG, C1 indicates whether the TDM bus is enabled, and D1 indicates a bias signal which is set active on the "preferred" channelizer to allow that channelizer to assert data on the TDM bus when both magnitudes are equal.

Thus, for example, the output of the first assertion logic 174A will be true only if the LOCAL-MAG is greater than the EXT-MAG, the TDM ON signal indicates that the TDM bus output is enabled, and the bias signal is asserted. Similarly, in the event that the BIAS signal is asserted for this channelizer, and the LOCAL-MAG equals the EXT-MAG, the output will be asserted.

This feature enables the diversity implementation to be implemented with identical diversity logic circuits for each channelizer, greatly simplifying the overall implementation of the diversity logic.

The BIAS signal also provides a mechanism for insuring that, in the event that outputs of the two channelizers are the same, a given channelizer be always permitted to assert data onto the TDM bus 16.

The output of the first assertion logic circuit 174A is stored in the register 175A in synchronism with the TDM clock signals, to remain synchronous with the TDM bus 16, and is used as a LOCAL-DECIDE SIGNAL. The output is then fed to the second assertion logic circuit 176A, where it is combined with the EXT-DECIDE signal which is equivalent to the LOCAL-DECIDE signal but determined by the other channelizer. Specifically, the LOCAL-DECIDE signal is fed to a first input A2 of the second assertor logic 176A, and the EXT-DECIDE signal to input B2. The logic 176A then determines:

F4=A2 and not B2 so that assertion of the present channelizer's output onto the TDM bus 16 occurs only if the magnitude comparison result indicates that the LOCAL-MAG is greater than the EXT-MAG, and that the other channelizer determined that its own LOCAL-MAG was not greater than its own EXT-MAG.

This logical result is then stored in the register 177A synchronous to the TDM bus 16 and then used as the output enable (OE) signal to control the output registers 162A. The signal TDM-I is thus the in-phase (I) component of the TDM bus 16 and the signal TDM-Q is the quadrature (Q) component of the TDM bus 16.

The LOCAL DECIDE signal is in turn forwarded to the other channelizer's decision logic circuits for its own TDM output enable decision.

The diversity decision also preferably includes hysteresis to avoid needless switching between the two receive paths for each channel.

Hysteresis may be implemented, as shown in FIG. 3, by making use of the LAST-DECIDE output, which is a logic one when a given channel's respective channelizer output was enabled on the last sample of the respective channel. To implement hysteresis, M of the least significant bits of the LAST-DECIDE output with zeroes. This left-shifted version of the LAST-DECIDE output is then added to the LOCAL-MAG signal before forwarding the LOCAL-MAG signal to the magnitude compare function 171A. This hysteresis function causes the decision threshold to be biased in favor of the previously enabled channelizer, with the amount of the bias is a function of the number, M, of least significant bits of the magnitude that are replaced by the last decision bit.

For example, in the event that three least significant bits are replaced, such as shown in FIG. 3 eight (8) decibels (dB) of hysteresis is provided.

The dual port ram 178A permits hysteresis to be implemented by serving as a memory for the decisions made for each of the last N channels. Thus the present LOCAL-DECIDE signal is fed from the register 175A to a data input of the dual port ram 178A. The address input of the dual port ram 178A is taken from the time slot address signal which is generated by the time slot bus synchronization circuit 32. A delay block 179A provides a suitable number of delay cycles (e.g., delayed by the number of time slots on the TDM bus 16) so that the output of the dual port ram 178A provides the LAST-DECIDE signal indicating the value of the previous LOCAL-DECIDE signal at the output of the dual port 178A.

In conclusion then, a diversity logic circuit in accordance with the invention includes a magnitude circuit for determining the magnitude of a series of channel samples as provided by as associated wideband, multichannel, digital channelizer 14. A series of channel samples are fed, in parrelled both to a local decide logic circuit 170A as well as a decide logic circuit 170B associated with another channelizer. The local decision output and an external decision output arc is then used to determine whether the register 162A associated with the current channelizer is to be enabled to assert data onto the TDM bus. A delay block 161A inserted between the output of the channelizer 16A and the input of the bus register 162A provides an appropriate delay to compensate for the delay associated with magnitude and decision logic circuits 150, 170. The decision from the other channelizer is also used, to assure that the two channelizers are never asserted at the same time, regardless of the state of hysteresis calculation or the state of the magnitude comparison.

I claim:

1. A base station for processing signals in a multiple mobile subscriber unit wireless communication system comprising:

a first antenna for receiving signals from a plurality of the mobile subscriber units as first composite radio frequency, RF, signal;

first wideband digital tuner means, connected to the first antenna, for downconverting a selected bandwidth of the first composite RF signal to a first intermediate frequency, IF, signal and for performing an analog to digital conversion on the first IF signal, to provide a first wideband tuner output signal;

first digital channelization means, being connected to receive the first wideband tuner output signal, and providing a first set of digital channel signal outputs in a predetermined sequential order, each digital channel signal output in the first set of digital channel signal outputs having a predetermined channel bandwidth, and each one of the first set of digital channel signal outputs corresponding to one of the signals received from one of the mobile units;

a second antenna for receiving signals from the plurality of mobile units as second composite RF signal;

second wideband digital tuner means, connected to the second antenna, for downconverting the selected bandwidth of the second composite RF signal to a second IF signal and for performing an analog to digital conversion on the second IF signal, to provide a second wideband tuner output signal;

second digital channelization means, being connected to receive the second wideband tuner output signal, and providing a second set of digital channel signal outputs in the same predetermined sequential order as the first set of digital channel signal outputs, each one of the second set of digital channel signal outputs having the same predetermined channel bandwidth as the first set of digital channel signal outputs, and each one of the second set of digital channel signal outputs corresponding to one of the signals received from one of the mobile units; and sequential diversity processing means, being connected to receive the first set of digital channel signal outputs and the second set of digital channel signal outputs, for comparing a magnitude of respective ones of the first set of digital channel signal outputs to a magnitude of corresponding ones of the second set of digital channel signal outputs, to provide a set of diversity processed digital channel signals.

2. A base station as in claim 1 additionally comprising:

a plurality of digital signal processing means, for providing digitally processed channel signal outputs; and time division multiplex switching means, being connected to receive the diversity processed digital channel signals and the plurality of digital signal processing means, the switching means for interconnecting any one of the diversity processed digital channel signal outputs to any one of the plurality of digital signal processing means.

3. A base station as in claim 1 wherein the sequential diversity processing means compares each of the first and second set of digital channel signal outputs in the predetermined sequential order, to determine which one of digital channel signal outputs contains a strongest received signal strength for each channel.

4. A base station as in claim 2 wherein the sequential diversity processing means additionally provides the set of diversity processed digital channel signals in the same predetermined sequential order.

5. A base station as in claim 1 wherein the sequential diversity processing means additionally comprises:

first delay means, being connected to receive the first set of digital channel signal outputs, and to provide a first delayed set of digital channel signal outputs delayed by a predetermined delay amount;

second delay means, being connected to receive the second set of digital channel signal outputs, and to provide a second delayed set of digital channel signal outputs delayed by the same predetermined delay amount;

magnitude comparison means, connected to receive the first and second set of digital channel signal outputs at respective first and second signal inputs, and to provide a diversity logic signal; and multiplexing means, connected to receive the first and second delayed sets of digital channel signal outputs at respective first and second signal inputs, and also connected to receive the diversity logic signal at a control input, to select, in the predetermined sequential order, a digital channel signal from the first or second set of digital channel signals as the diversity processed digital channel signal.

6. A base station as in claim 1 wherein the sequential diversity processing means additionally comprises:

first diversity logic means consisting of:

first magnitude determining means, being connected to receive the first set of digital channel signal outputs and to provide a first set of local magnitude signals in the predetermined order;

first delay means, being connected to receive the first set of digital channel signals, and to provide a first delayed set of digital channel signals in the predetermined order;

first decision logic means, connected to receive the first set of local magnitude signals, a second set of external magnitude signals, and a second set of external decision signals, for asserting each one of a first set of local decision signals, in the predetermined sequential order for each channel, if a magnitude of a respective one of the first local magnitude signals is greater than a magnitude of a respective one of the second set of external magnitude signals, and for providing the first set of local decision signals as a first set of external decision signals at an output, and for providing the first set of local magnitude signals as a first set of external magnitude signals at an output; and first output register means, connected to receive the first set of local decision signals and the first delayed set of digital channel signals, for asserting respective ones of the first delayed set of digital channel signals as the corresponding one of the set of diversity processed digital channel signals if a corresponding one of the first set of local decision signals is asserted; and second diversity logic means consisting of:

second magnitude determining means, being connected to receive the second set of digital channel signal outputs and to provide a second set of local magnitude signals in the predetermined order;

second delay means, being connected to receive the second set of digital channel signals, and to provide a second delayed set of digital channel signals in the predetermined order;

second decision logic means, connected to receive the second set of local magnitude signals, the first set of external magnitude signals, and the first set of external decision signals, for asserting each one of a second set of local decision signals, in the predetermined sequential order for each channel, if a magnitude of a respective one of the second local magnitude signals is greater than a magnitude of a respective one of the first set of external magnitude signals, and for providing the second set of local decision signals as the second set of external decision signals at an output, and for providing the second set of local magnitude signals as a second set of external magnitude signals at an output; and second output register means, connected to receive the second set of local decision signals and the second delayed set of digital channel signals, for asserting respective ones of the second delayed set of digital channel signals as the corresponding one of the set of diversity processed digital channel signals if a corresponding one of the second set of local decision signals is asserted.

7. A base station as in claim 6 wherein said first decision logic means additionally includes first hysteresis means, connected to receive the first set of local decision signals, and the first local magnitude signal, for adding a predetermined amount to the first local magnitude signal if a corresponding one of the first set of local decision signals is asserted.

8. A base station as in claim 6 wherein said second decision logic means additionally includes:

second hysteresis means, connected to receive the second set of local decision signals and the second local magnitude signal, for adding a predetermined amount to the second local magnitude signal if a corresponding one of the second set of local decision signals is asserted.

* * * * *